(12) United States Patent
Lee et al.

(10) Patent No.: US 12,543,089 B2
(45) Date of Patent: Feb. 3, 2026

(54) METHOD AND APPARATUS FOR UTILIZING A DYNAMIC CONFIGURATION IN A WIRELESS COMMUNICATION SYSTEM

(71) Applicant: LG ELECTRONICS INC., Seoul (KR)

(72) Inventors: Oanyong Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 540 days.

(21) Appl. No.: 17/923,880

(22) PCT Filed: May 7, 2021

(86) PCT No.: PCT/KR2021/005720
§ 371 (c)(1),
(2) Date: Nov. 7, 2022

(87) PCT Pub. No.: WO2021/256704
PCT Pub. Date: Dec. 23, 2021

(65) Prior Publication Data
US 2023/0189108 A1    Jun. 15, 2023

(30) Foreign Application Priority Data
Jun. 16, 2020  (KR) .................. 10-2020-0072926

(51) Int. Cl.
*H04W 36/24*   (2009.01)
*H04L 5/00*    (2006.01)
*H04W 48/20*   (2009.01)

(52) U.S. Cl.
CPC .......... *H04W 36/24* (2013.01); *H04L 5/0073* (2013.01); *H04W 48/20* (2013.01)

(58) Field of Classification Search
CPC .............. H04W 36/249; H04W 36/32; H04W 36/0083; H04W 36/0088
See application file for complete search history.

(56) References Cited

U.S. PATENT DOCUMENTS

2009/0290530 A1   11/2009  Dankberg et al.
2017/0311213 A1   10/2017  Dinan
(Continued)

FOREIGN PATENT DOCUMENTS

WO      2020/088283 A1    5/2020

OTHER PUBLICATIONS

Section 5.2.2 and Section 5.5, "3rd Generation Partnership Project; Technical Specification Group Radio Access Network; NR; Radio Resource Control (RRC) protocol specification (Release 16)", 3GPP TS 38.331 V16.0.0 (Mar. 2020).

*Primary Examiner* — Barry W Taylor
(74) *Attorney, Agent, or Firm* — BRYAN CAVE LEIGHTON PAISNER LLP

(57) ABSTRACT

A method and apparatus for utilizing a dynamic configuration in a wireless communication system is provided. A wireless device receives, from a network, a single configuration set including a first configuration associated with a first time information and a second configuration associated with a second time information. A wireless device applies the first configuration based on the first time information. A wireless device applies the second configuration and discarding the first configuration based on the second time information. The single configuration set is different from another single configuration set provided for another wireless device in the cell.

20 Claims, 14 Drawing Sheets

(56) References Cited

U.S. PATENT DOCUMENTS

| | | |
|---|---|---|
| 2018/0302147 A1 | 10/2018 | Lejnell et al. |
| 2020/0077358 A1 | 3/2020 | Kovacs et al. |
| 2021/0068013 A1* | 3/2021 | Cheng .................. H04W 48/18 |
| 2022/0132383 A1* | 4/2022 | Shrestha ........... H04W 36/0061 |
| 2022/0252736 A1* | 8/2022 | Fu ........................ G01S 19/256 |
| 2022/0353714 A1* | 11/2022 | Fu ........................ H04B 7/1853 |
| 2023/0135073 A1* | 5/2023 | Xu .................. H04W 36/00835 |
| | | 370/331 |
| 2023/0300699 A1* | 9/2023 | Hong .................. H04B 7/1851 |
| | | 370/331 |
| 2024/0323811 A1* | 9/2024 | Leng .................... H04W 24/10 |
| 2024/0340755 A1* | 10/2024 | Sedin ................. H04W 36/249 |

* cited by examiner

METHOD AND APPARATUS FOR UTILIZING A DYNAMIC CONFIGURATION IN A WIRELESS COMMUNICATION SYSTEM

CROSS-REFERENCE TO RELATED APPLICATIONS

This application is the National Stage filing under 35 U.S.C. 371 of International Application No. PCT/KR2021/005720, filed on May 7, 2021, which claims the benefit of Korean Patent Application No. 10-2020-0072926 filed on Jun. 16, 2020, which are hereby incorporated by reference herein in its entirety.

TECHNICAL FIELD

The present disclosure relates to a method and apparatus for utilizing a dynamic configuration in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Thanks to the wide service coverage capabilities and reduced vulnerability of space/airborne vehicles to physical attacks and natural disasters, non-terrestrial networks (NTN) are expected to:
- foster the roll out of 5G service in un-served areas that cannot be covered by terrestrial 5G network (isolated/remote areas, on board aircrafts or vessels) and under-served areas (e.g., sub-urban/rural areas) to upgrade the performance of limited terrestrial networks in cost effective manner,
- reinforce the 5G service reliability by providing service continuity for machine-to-machine (M2M)/Internet-of-things (IoT) devices or for passengers on board moving platforms (e.g., passenger vehicles-aircraft, ships, high speed trains, bus) or ensuring service availability anywhere especially for critical communications, future railway/maritime/aeronautical communications, and to
- enable 5G network scalability by providing efficient multicast/broadcast resources for data delivery towards the network edges or even user terminal.

SUMMARY

In NTN, low Earth orbit (LEO) satellites may revolve around the earth and each LEO satellite may have different orbit and cycle of revolution. Therefore, from view of UE on the ground, a list of LEO satellites may change dynamically.

Regarding that maximum beam foot print size of Geostationary Earth Orbiting (GEO) satellite is 3500 km and maximum beam foot print size of LEO satellite is 1000 km, it is expected that much more UEs would camp on NTN cell compared with terrestrial NR cells. Therefore, it would increase much signalling load to provide dedicated signalling or broadcast signalling to the UEs by NTN cell.

For example, list of neighbour LEO satellite cells may change as time goes because of revolutions of satellites. Each UE camping on an NTN cell may have different neighbour cell list based on its geographical area. Therefore, it may need very big signalling load to provide different neighbour cell list to each UE.

As LEO satellites revolves around the earth periodically and the trace is almost fixed, it can be assumed that change of the neighbour NTN cell list is predictable. Therefore, if the network provides list of sets of neighbour NTN cell list to each UE with one-shot signalling and each UE applies the list of sets sequentially as time goes, the network may not need to provide the neighbour cell list to each UE every time it changes.

Therefore, studies for utilizing a dynamic configuration in a wireless communication system are required.

In an aspect, a method performed by a wireless device in a wireless communication system is provided. A wireless device receives, from a network, a single configuration set including a first configuration associated with a first time information and a second configuration associated with a second time information. A wireless device applies the first configuration based on the first time information. A wireless device applies the second configuration and discarding the first configuration based on the second time information. The single configuration set is different from another single configuration set provided for another wireless device in the cell.

In another aspect, an apparatus for implementing the above method is provided.

The present disclosure can have various advantageous effects.

According to some embodiments of the present disclosure, a wireless device could apply dynamic configuration efficiently.

For example, a wireless device could receive a set of configuration through a single message.

For example, a wireless device could change configuration by itself for a measurement procedure, a cell selection procedure, and/or a cell reselection procedure based on the set of configuration and a time information.

According to some embodiments of the present disclosure, a wireless communication system could efficiently provide a solution for utilizing a dynamic configuration.

For example, a network may not need to provide configuration every time the configuration changes. Based on the parameters and validity timer in each configuration included in a set of configuration, the UE could apply the configurations in sequence based on the validity timer by itself.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
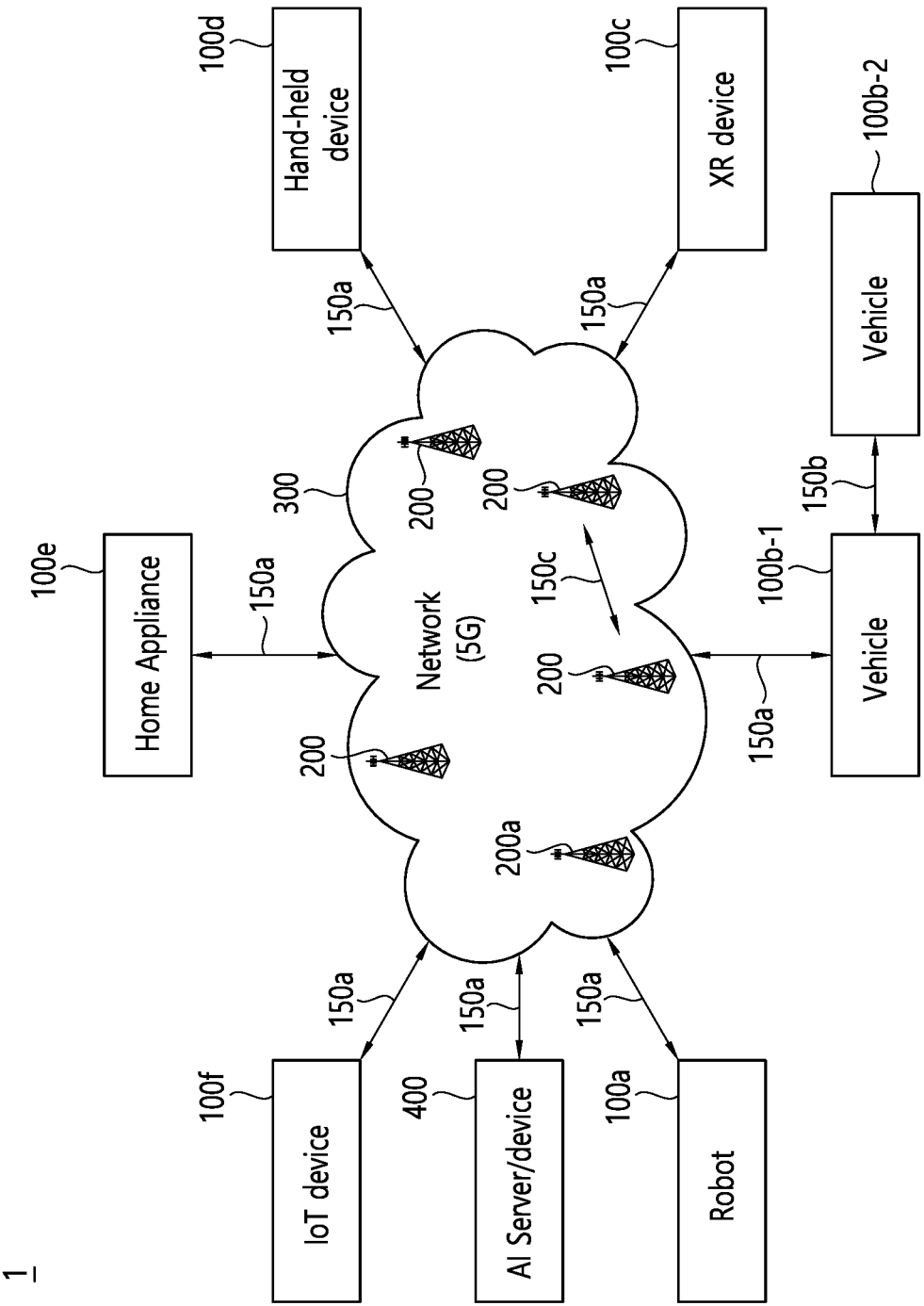
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FITH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
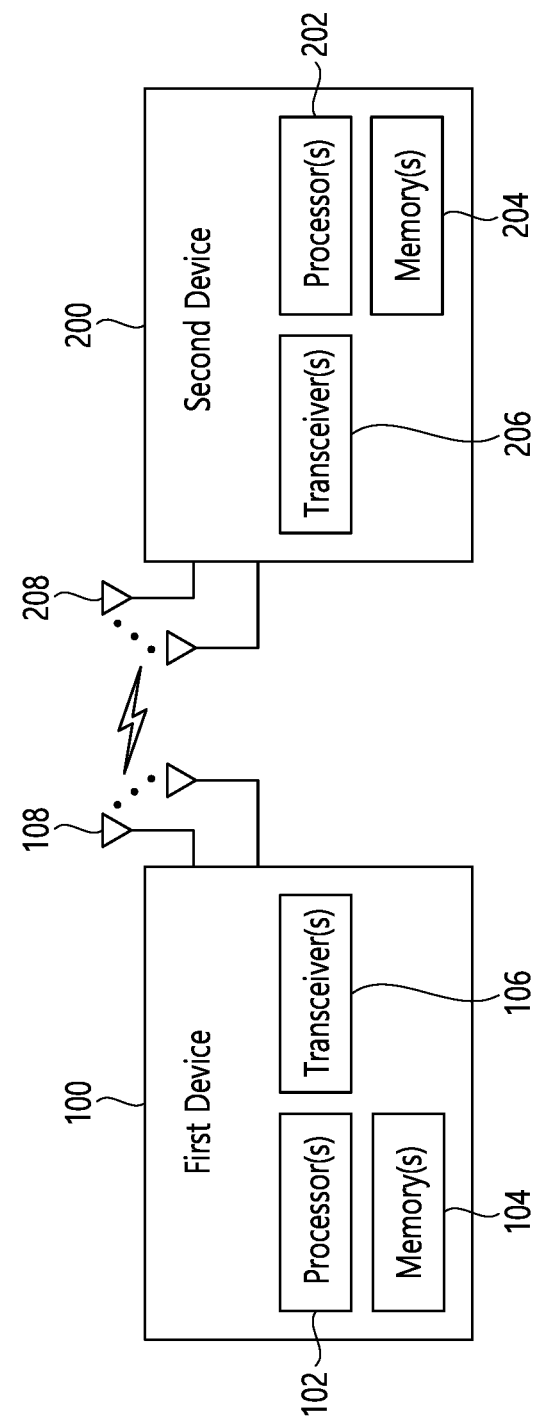
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
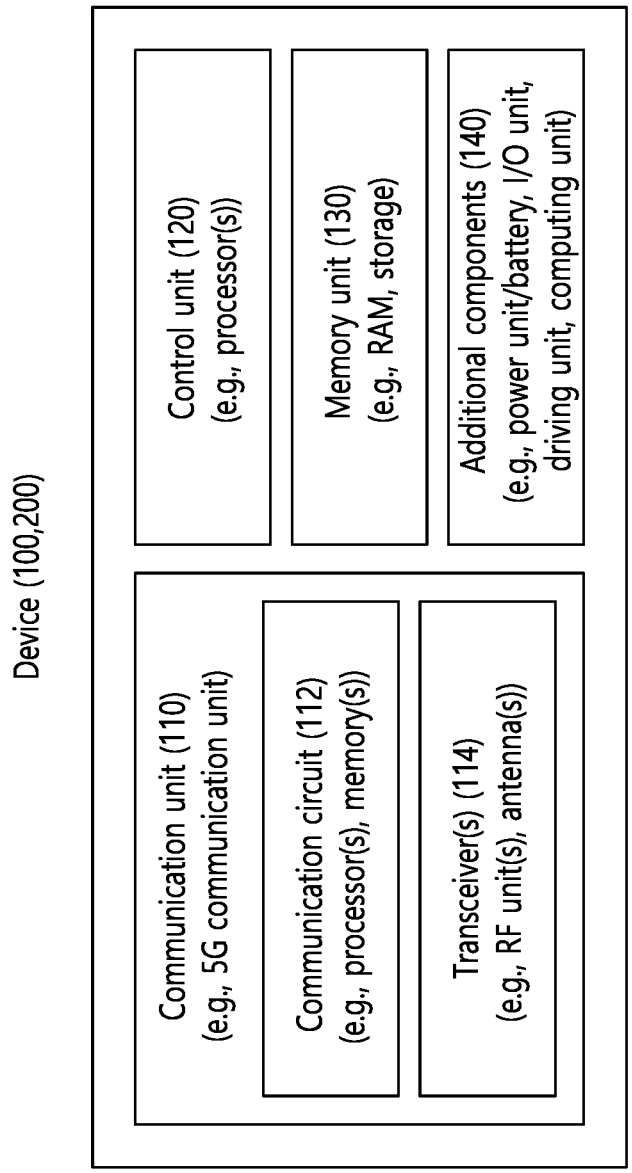
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
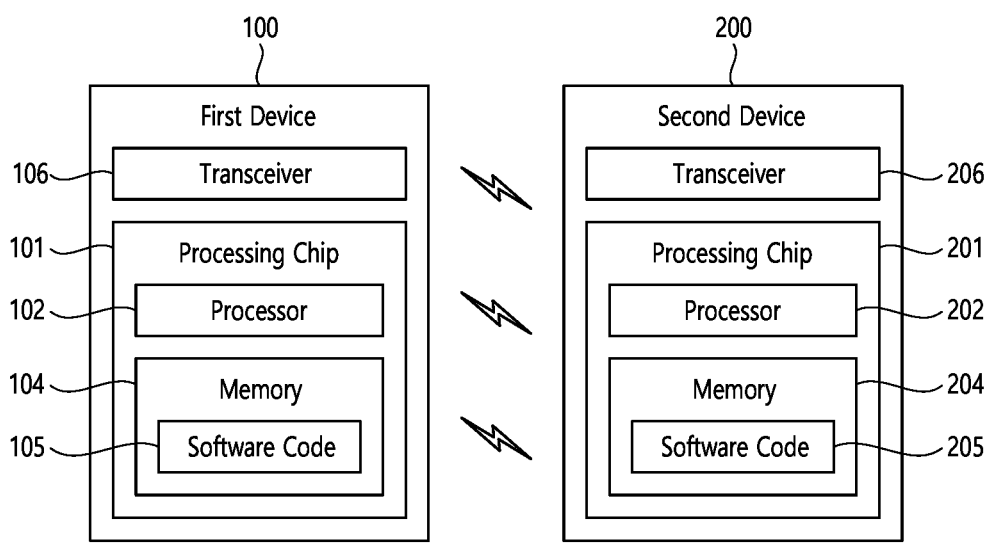
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
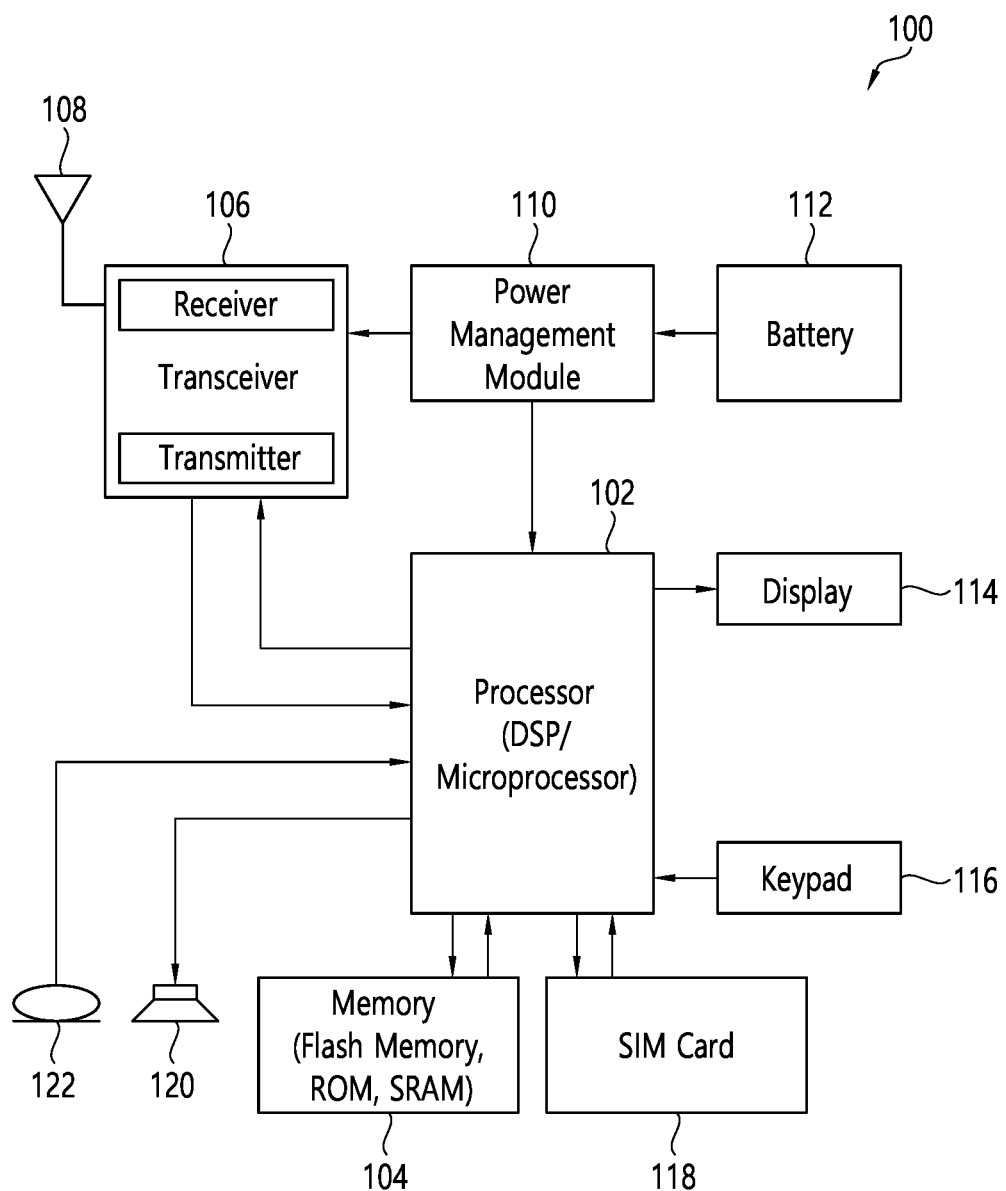
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
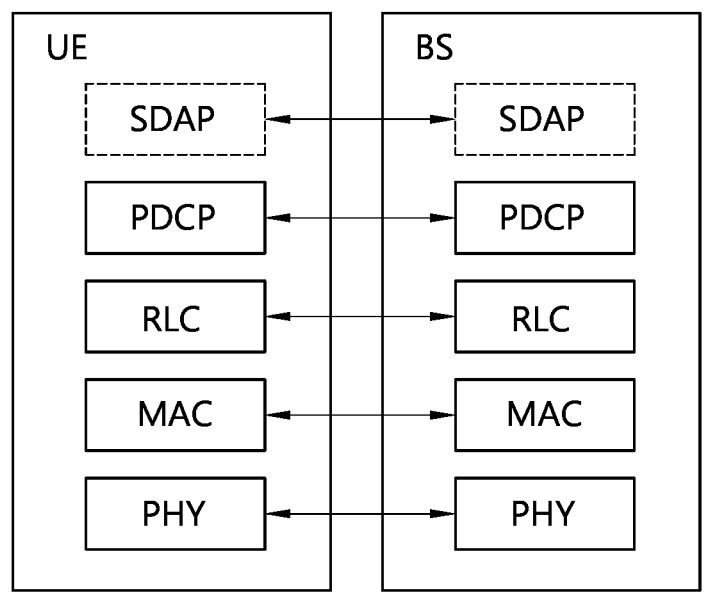
FIGS. 6 and 7 show an example of protocol stacks in a 3GPP based wireless communication system to which implementations of the present disclosure is applied.
Figure 7:
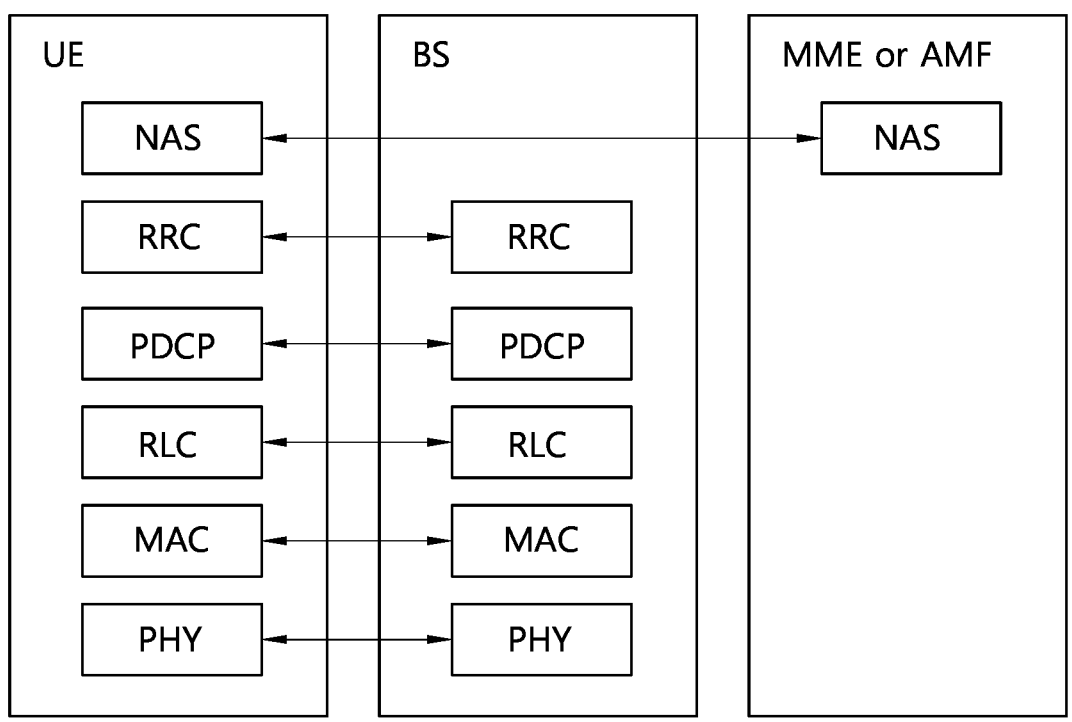

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
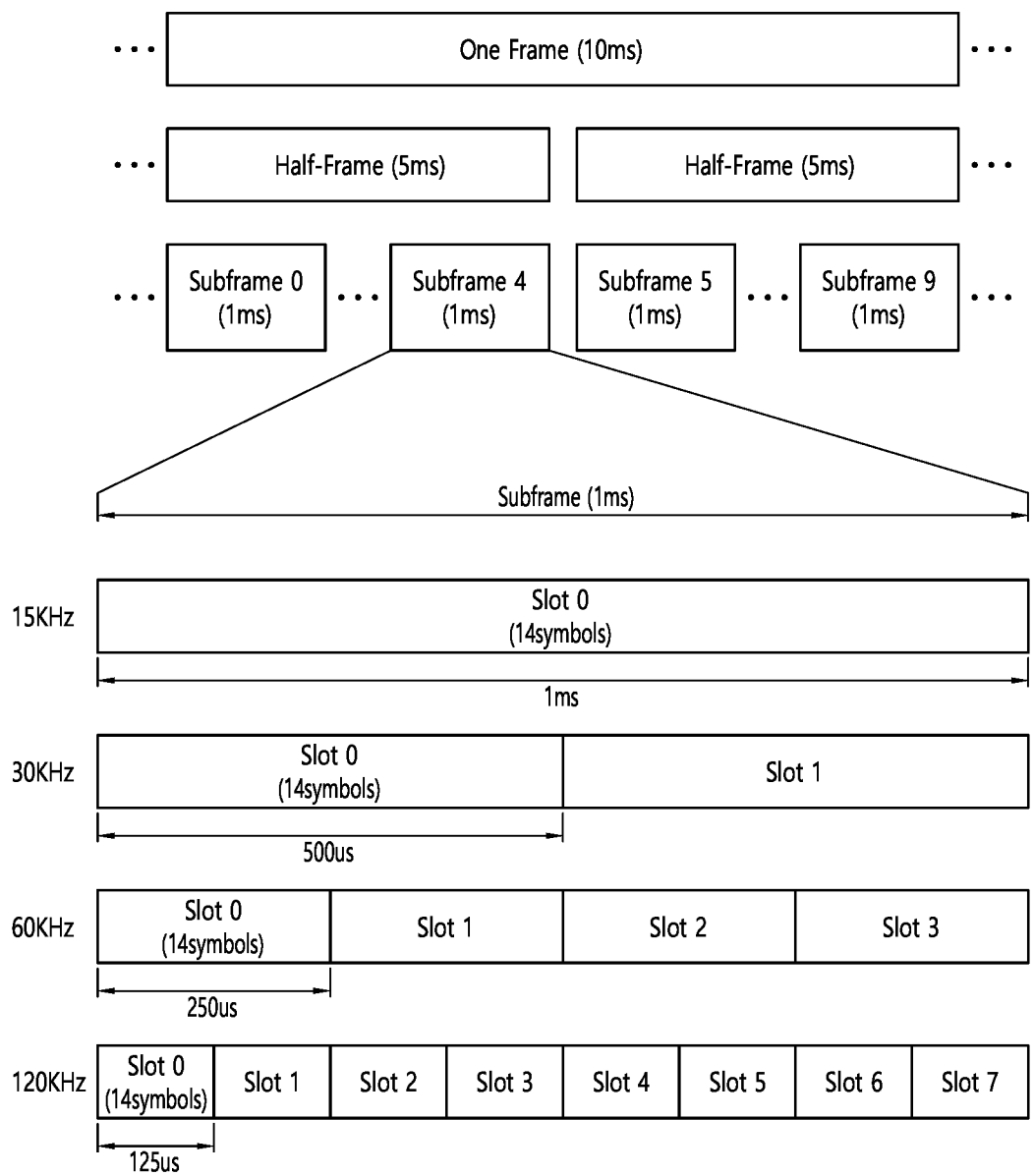
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub6 GHz range", FR2 may mean "above 6 GHz range," and may be referred to as millimeter wave (mmW).

TABLE 3

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
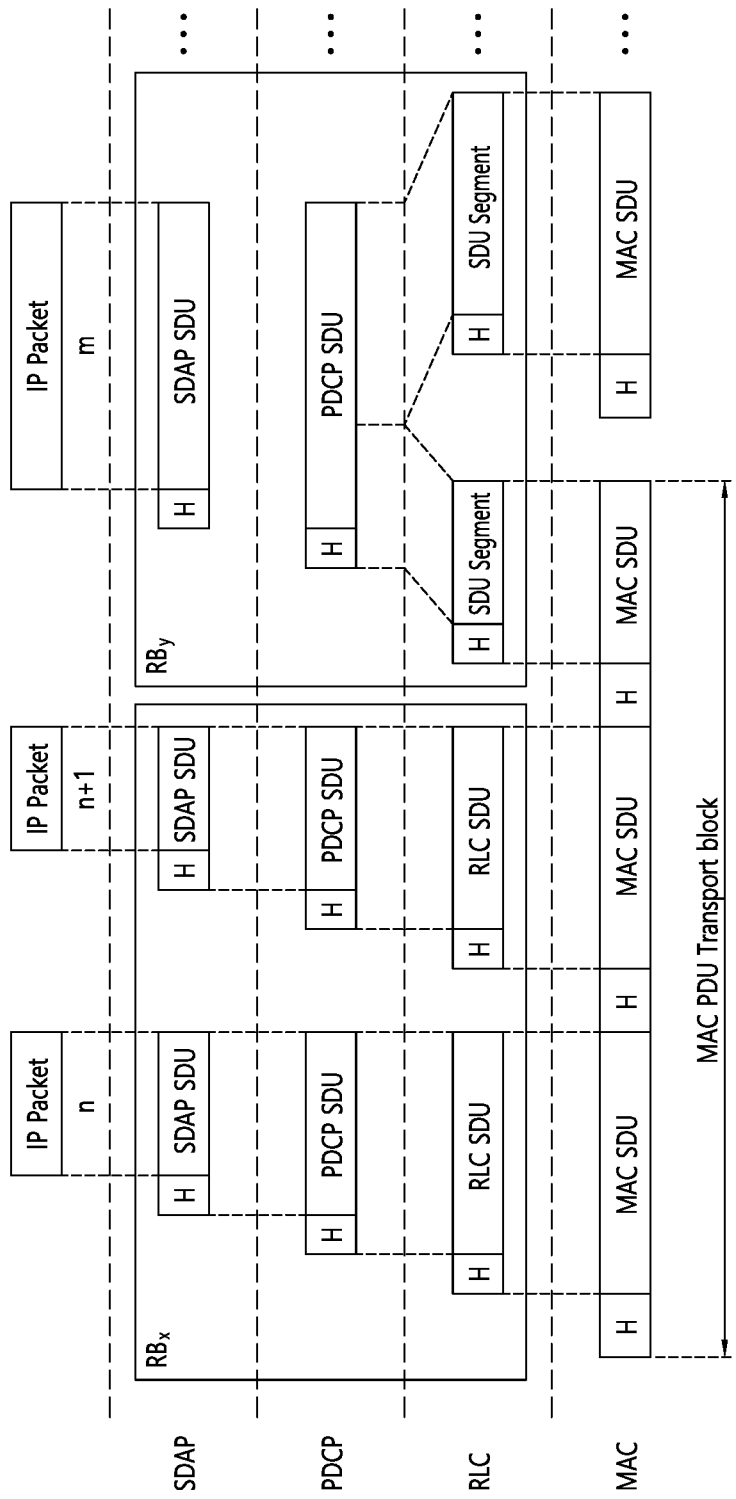
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, system information acquisition procedure is described. Section 5.2.2 of 3GPP TS 38.331 v16.0.0 may be referred.

The UE applies the SI acquisition procedure to acquire the AS, NAS- and positioning assistance data information. The procedure applies to UEs in RRC_IDLE, in RRC_INACTIVE and in RRC_CONNECTED.

The UE in RRC_IDLE and RRC_INACTIVE shall ensure having a valid version of (at least) the MIB, SIB1 through SIB4, SIB5 (if the UE supports E-UTRA) and SIB)) (if the UE is configured for idle/inactive measurements).

The UE shall apply the SI acquisition procedure upon cell selection (e.g. upon power on), cell-reselection, return from out of coverage, after reconfiguration with sync completion, after entering the network from another RAT, upon receiving an indication that the system information has changed, upon receiving a PWS notification, upon receiving a positioning request from upper layers; and whenever the UE does not have a valid version of a stored SIB.

When the UE acquires a MIB or a SIB) or an SI message in a serving cell, and if the UE stores the acquired SIB, then the UE shall store the associated areaScope, if present, the first PLMN-Identity in the PLMN-IdentityInfoList for non-NPN-only cells, the first NPN-Identity (SNPN identity in case of SNPN, or PNI-NPN identity in case of PNI-NPN) in the NPN-IdentityInfoList for NPN-only cells, the cellIdentity, the systeminformationAreaID, if present, and the valueTag, if present, as indicated in the si-SchedulingInfo for the SIB. The UE may use a valid stored version of the SI except MIB, SIB), SIB6, SIB7 or SIB8 e.g. after cell re-selection, upon return from out of coverage or after the reception of SI change indication. The value tag for posSIB is optionally provided in LPP signalling.

The storage and management of the stored SIBs in addition to the SIBs valid for the current serving cell is left to UE implementation.

SI change indication and PWS notification is described.

A modification period is used, i.e. updated SI message (other than SI message for ETWS, CMAS and positioning assistance data) is broadcasted in the modification period following the one where SI change indication is transmitted. The modification period boundaries are defined by SFN values for which SFN mod m=0, where m is the number of radio frames comprising the modification period. The modification period is configured by system information. The UE receives indications about SI modifications and/or PWS notifications using Short Message transmitted with P-RNTI over DCI. Repetitions of SI change indication may occur within preceding modification period. SI change indication is not applicable for SI messages containing posSIBs.

UEs in RRC_IDLE or in RRC_INACTIVE shall monitor for SI change indication in its own paging occasion every DRX cycle. UEs in RRC_CONNECTED shall monitor for SI change indication in any paging occasion at least once per modification period if the UE is provided with common search space on the active BWP to monitor paging.

ETWS or CMAS capable UEs in RRC_IDLE or in RRC_INACTIVE shall monitor for indications about PWS notification in its own paging occasion every DRX cycle. ETWS or CMAS capable UEs in RRC_CONNECTED shall monitor for indication about PWS notification in any paging occasion at least once every defaultPagingCycle if the UE is provided with common search space on the active BWP to monitor paging.

For Short Message reception in a paging occasion, the UE monitors the PDCCH monitoring occasion(s) for paging.

Hereinafter, measurements procedure is described. Section 5.5 of 3GPP TS 38.331 v16.0.0 may be referred.

The network may configure an RRC_CONNECTED UE to perform measurements. The network may configure the UE to report them in accordance with the measurement configuration or perform conditional configuration evaluation in accordance with the conditional configuration. The measurement configuration is provided by means of dedicated signalling i.e. using the RRCReconfiguration or RRCResume.

The network may configure the UE to perform the following types of measurements:
NR measurements;
Inter-RAT measurements of E-UTRA frequencies.
Inter-RAT measurements of UTRA-FDD frequencies.

The network may configure the UE to report the following measurement information based on SS/PBCH block(s):
Measurement results per SS/PBCH block;
Measurement results per cell based on SS/PBCH block(s);
SS/PBCH block(s) indexes.

The network may configure the UE to report the following measurement information based on CSI-RS resources:

Measurement results per CSI-RS resource;
Measurement results per cell based on CSI-RS resource(s);
CSI-RS resource measurement identifiers.

The network may configure the UE to perform the following types of measurements for sidelink:
CBR measurements.

The network may configure the UE to report the following measurement information based on SRS resources:
Measurement results per SRS resource;
SRS resource(s) indexes.

The network may configure the UE to report the following measurement information based on CLI-RSSI resources:
Measurement results per CLI-RSSI resource;
CLI-RSSI resource(s) indexes.

The measurement configuration includes the following parameters:

1. Measurement objects: A list of objects on which the UE shall perform the measurements.
   For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.
   The measObjectId of the MO which corresponds to each serving cell is indicated by servingCellMO within the serving cell configuration.
   For inter-RAT E-UTRA measurements a measurement object is a single E-UTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.
   For inter-RAT UTRA-FDD measurements a measurement object is a set of cells on a single UTRA-FDD carrier frequency.
   For CBR measurement of NR sidelink communication, a measurement object is a set of transmission resource pool(s) on a single carrier frequency for NR sidelink communication.
   For CBR measurement of V2X sidelink communication, a measurement object is a set of transmission resource pool(s) on a carrier frequency for V2X sidelink communication.
   For CLI measurements a measurement object indicates the frequency/time location of SRS resources and/or CLI-RSSI resources, and subcarrier spacing of SRS resources to be measured.

2. Reporting configurations: A list of reporting configurations where there can be one or multiple reporting configurations per measurement object. Each measurement reporting configuration consists of the following:
   Reporting criterion: The criterion that triggers the UE to send a measurement report. This can either be periodical or a single event description.
   RS type: The RS that the UE uses for beam and cell measurement results (SS/PBCH block or CSI-RS).
   Reporting format: The quantities per cell and per beam that the UE includes in the measurement report (e.g. RSRP) and other associated information such as the maximum number of cells and the maximum number beams per cell to report.

In case of conditional configuration triggering configuration, each configuration consists of the following:

Execution criteria: The criteria that triggers the UE to perform conditional configuration execution.

RS type: The RS that the UE uses for beam and cell measurement results (SS/PBCH block or CSI-RS) for conditional configuration execution condition.

3. Measurement identities: For measurement reporting, a list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network. For conditional configuration triggering, one measurement identity links to exactly one conditional configuration trigger configuration. And up to 2 measurement identities can be linked to one conditional configuration execution condition.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

A UE in RRC_CONNECTED maintains a measurement object list, a reporting configuration list, and a measurement identities list according to signalling and procedures in this specification. The measurement object list possibly includes NR measurement object(s), CLI measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:

1. The NR serving cell(s)—these are the SpCell and one or more SCells.

2. Listed cells—these are cells listed within the measurement object(s).

3. Detected cells—these are cells that are not listed within the measurement object(s) but are detected by the UE on the SSB frequency(ies) and subcarrier spacing(s) indicated by the measurement object(s).

For NR measurement object(s), the UE measures and reports on the serving cell(s), listed cells and/or detected cells. For inter-RAT measurements object(s) of E-UTRA, the UE measures and reports on listed cells and detected cells and, for RSSI and channel occupancy measurements, the UE measures and reports on any reception on the indicated frequency. For inter-RAT measurements object(s) of UTRA-FDD, the UE measures and reports on listed cells. For CLI measurement object(s), the UE measures and reports on configured CLI measurement resources (i.e. SRS resources and/or CLI-RSSI resources).

Whenever the procedural specification refers to a field it concerns a field included in the VarMeasConfig unless explicitly stated otherwise i.e. only the measurement configuration procedure covers the direct UE action related to the received measConfig.

In NR-DC, the UE may receive two independent measConfig:

a measConfig, associated with MCG, that is included in the RRCReconfiguration message received via SRB1; and a measConfig, associated with SCG, that is included in the RRCReconfiguration message received via SRB3, or, alternatively, included within a RRCReconfiguration message embedded in a RRCReconfiguration message received via SRB1.

The configurations related to CBR measurements are only included in the measConfig associated with MCG.

In this case, the UE maintains two independent VarMeasConfig and VarMeasReportList, one associated with each measConfig, and independently performs all the procedures for each measConfig and the associated VarMeasConfig and VarMeasReportList, unless explicitly stated otherwise.

Measurement configuration is described.

The network applies the procedure as follows:

to ensure that, whenever the UE has a measConfig associated with a CG, it includes a measObject for the SpCell and for each NR SCell of the CG to be measured;

to configure at most one measurement identity across all CGs using a reporting configuration with the reportType set to reportCGI;

to configure at most one measurement identity per CG using a reporting configuration with the ul-DelayValueConfig;

to ensure that, in the measConfig associated with a CG:

for all SSB based measurements there is at most one measurement object with the same ssbFrequency;

an smtc1 included in any measurement object with the same ssbFrequency has the same value and that an smtc2 included in any measurement object with the same ssbFrequency has the same value;

to ensure that all measurement objects configured in this specification with the same ssbFrequency have the same ssbSubcarrierSpacing;

to ensure that, if a measurement object associated with the MCG has the same ssbFrequency as a measurement object associated with the SCG:

for that ssbFrequency, the measurement window according to the smtc1 configured by the MCG includes the measurement window according to the smtc1 configured by the SCG, or vice-versa, with an accuracy of the maximum receive timing difference.

if both measurement objects are used for RSSI measurements, bits in measurementSlots in both objects corresponding to the same slot are set to the same value. Also, the endSymbol is the same in both objects.

to ensure that, if a measurement object has the same ssbFrequency as a measurement object:

for that ssbFrequency, the measurement window according to the smtc includes the measurement window according to the smtc1, or vice-versa, with an accuracy of the maximum receive timing difference.

if both measurement objects are used for RSSI measurements, bits in measurementSlots in both objects corresponding to the same slot are set to the same value. Also, the endSymbol is the same in both objects.

when the UE is in NE-DC, NR-DC, or NR standalone, to configure at most one measurement identity across all CGs using a reporting configuration with the reportType set to reportSFTD;

For CSI-RS resources, the network applies the procedure as follows:

to ensure that all CSI-RS resources configured in each measurement object have the same center frequency, (startPRB+floor(nrofPRBs/2))

Non-terrestrial networks (NTN) in 5G NR is described. Section 3 and Section 4 of 3GPP TR 38.821 V16.0.0 (2020-01) can be referred.

NTN means networks, or segments of networks, using an airborne or space-borne vehicle to embark a transmission equipment relay node or base station. In NTN, the following terms may be used.

Availability: % of time during which the RAN is available for the targeted communication. Unavailable communication for shorter period than [Y] ms shall not be counted. The RAN may contain several access network components among which an NTN to achieve multi-connectivity or link aggregation.

Feeder link: Wireless link between NTN Gateway and satellite

Geostationary Earth orbit: Circular orbit at 35,786 km above the Earth's equator and following the direction of the Earth's rotation. An object in such an orbit has an orbital period equal to the Earth's rotational period and thus appears motionless, at a fixed position in the sky, to ground observers.

Low Earth Orbit: Orbit around the Earth with an altitude between 300 km, and 1500 km.

Medium Earth Orbit: region of space around the Earth above low Earth orbit and below geostationary Earth Orbit.

Minimum Elevation angle: minimum angle under which the satellite or UAS platform can be seen by a terminal.

Mobile Services: a radio-communication service between mobile and land stations, or between mobile stations Mobile Satellite Services: A radio-communication service between mobile earth stations and one or more space stations, or between space stations used by this service; or between mobile earth stations by means of one or more space stations Non-Geostationary Satellites: Satellites (LEO and MEO) orbiting around the Earth with a period that varies approximately between 1.5 hour and 10 hours. It is necessary to have a constellation of several Non-Geostationary satellites associated with handover mechanisms to ensure a service continuity.

Non-terrestrial networks: Networks, or segments of networks, using an airborne or space-borne vehicle to embark a transmission equipment relay node or base station.

NTN-gateway: an earth station or gateway is located at the surface of Earth, and providing sufficient RF power and RF sensitivity for accessing to the satellite (resp. HAPS). NTN Gateway is a transport network layer (TNL) node.

On Board processing: digital processing carried out on uplink RF signals aboard a satellite or an aerial.

On board NTN gNB: gNB implemented in the regenerative payload on board a satellite (respectively HAPS).

On ground NTN gNB: gNB of a transparent satellite (respectively HAPS) payload implemented on ground.

One-way latency: time required to propagate through a telecommunication system from a terminal to the public data network or from the public data network to the terminal. This is especially used for voice and video conference applications.

Regenerative payload: payload that transforms and amplifies an uplink RF signal before transmitting it on the downlink. The transformation of the signal refers to digital processing that may include demodulation, decoding, re-encoding, re-modulation and/or filtering.

Round Trip Delay: time required for a signal to travel from a terminal to the sat-gateway or from the sat-gateway to the terminal and back. This is especially used for web-based applications.

Satellite: a space-borne vehicle embarking a bent pipe payload or a regenerative payload telecommunication transmitter, placed into Low-Earth Orbit (LEO), Medium-Earth Orbit (MEO), or Geostationary Earth Orbit (GEO).

Satellite beam: A beam generated by an antenna on-board a satellite

Service link: Radio link between satellite and UE

Transparent payload: payload that changes the frequency carrier of the uplink RF signal, filters and amplifies it before transmitting it on the downlink Unmanned Aircraft Systems: Systems encompassing Tethered UAS (TUA), Lighter Than Air UAS (LTA), Heavier Than Air UAS (HTA), all operating in altitudes typically between 8 and 50 km including High Altitude Platforms (HAPs)

User Connectivity: capability to establish and maintain data/voice/video transfer between networks and Terminals User Throughput: Data Rate Provided to a Terminal A non-terrestrial network refers to a network, or segment of networks using RF resources on board a satellite (or UAS platform).

Figure 10:
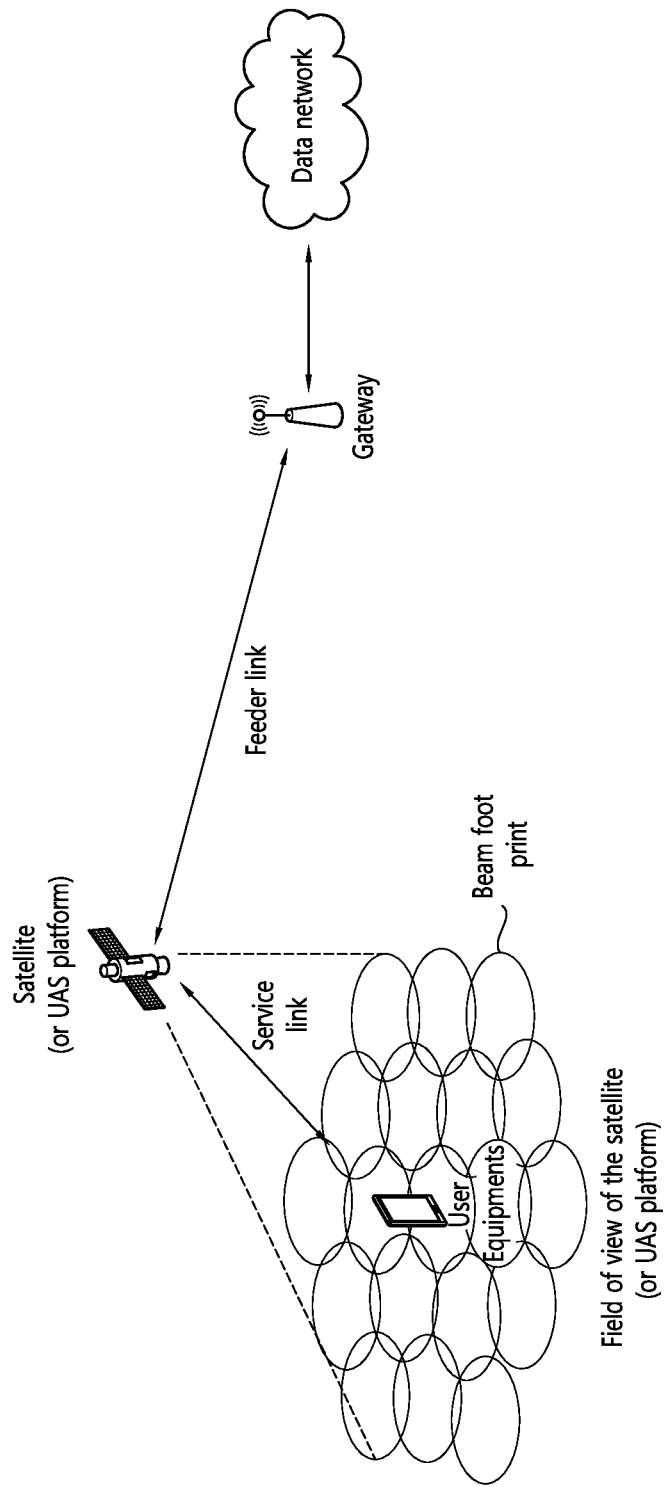
FIG. 10 and FIG. 11 shows typical scenarios of a non-terrestrial network providing access to user equipment.
Figure 11:
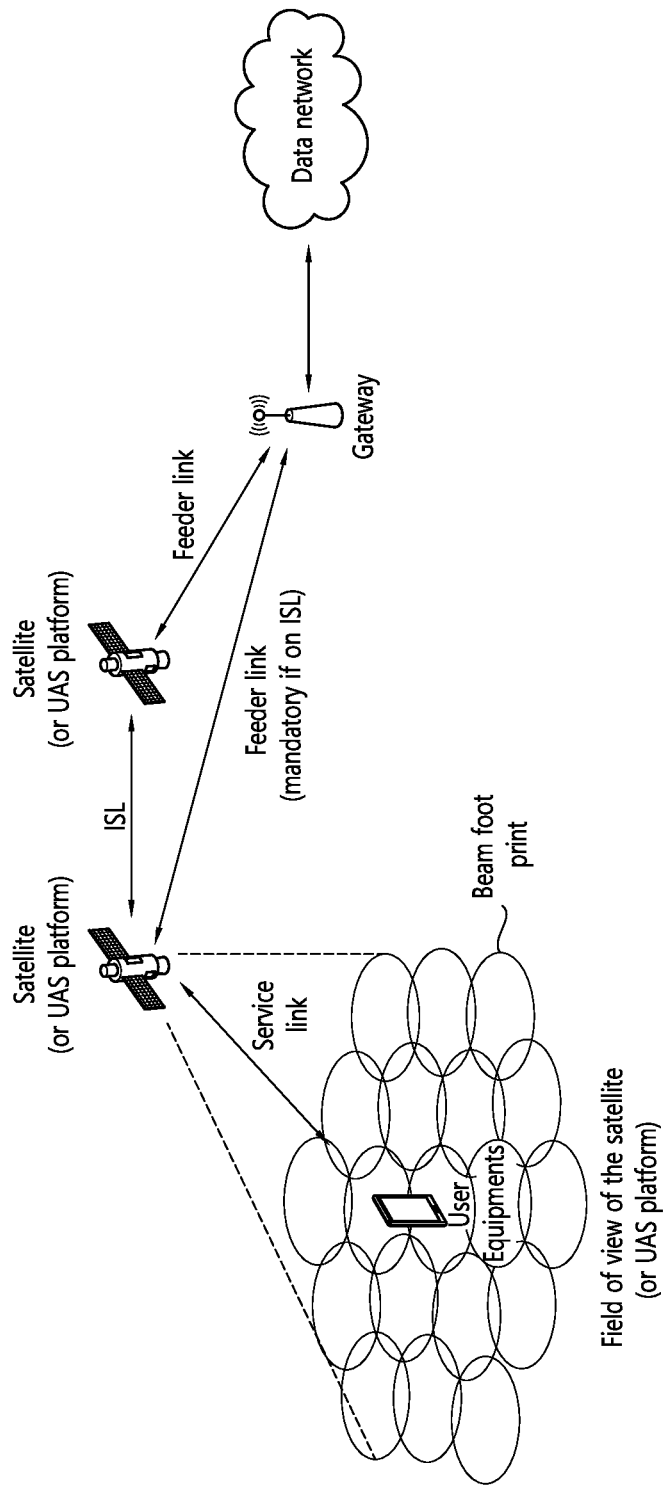

FIG. 10 and FIG. 11 shows typical scenarios of a non-terrestrial network providing access to user equipment.

In particular, FIG. 10 illustrates an example of non-terrestrial network typical scenario based on transparent payload. FIG. 11 illustrates an example of non-terrestrial network typical scenario based on regenerative payload Non-Terrestrial Network typically features the following elements:

- One or several sat-gateways that connect the Non-Terrestrial Network to a public data network
- a GEO satellite is fed by one or several sat-gateways which are deployed across the satellite targeted coverage (e.g. regional or even continental coverage). We assume that UE in a cell are served by only one sat-gateway
- A Non-GEO satellite served successively by one or several sat-gateways at a time. The system ensures service and feeder link continuity between the successive serving sat-gateways with sufficient time duration to proceed with mobility anchoring and hand-over
- A Feeder link or radio link between a sat-gateway and the satellite (or UAS platform)
- A service link or radio link between the user equipment and the satellite (or UAS platform).
- A satellite (or UAS platform) which may implement either a transparent or a regenerative (with on board processing) payload. The satellite (or UAS platform) generate beams typically generate several beams over a given service area bounded by its field of view. The footprints of the beams are typically of elliptic shape. The field of view of a satellites (or UAS platforms) depends on the on board antenna diagram and min elevation angle.
- A transparent payload: Radio Frequency filtering, Frequency conversion and amplification. Hence, the waveform signal repeated by the payload is un-changed;
- A regenerative payload: Radio Frequency filtering, Frequency conversion and amplification as well as demodulation/decoding, switch and/or routing, coding/modulation. This is effectively equivalent to having all or part of base station functions (e.g. gNB) on board the satellite (or UAS platform).
- Inter-satellite links (ISL) optionally in case of a constellation of satellites. This will require regenerative payloads on board the satellites. ISL may operate in RF frequency or optical bands.
- User Equipment are served by the satellite (or UAS platform) within the targeted service area.

Table 5 shows types of NTN platforms. For example, there may be different types of satellites (or UAS platforms).

TABLE 5

| Platforms | Altitude range | Orbit | Typical beam footprint size |
|---|---|---|---|
| Low-Earth Orbit (LEO) satellite | 300-1500 km | Circular around the earth notional station keeping position fixed in terms of elevation/azimuth with respect to a given earth point | 100-1000 km |
| Medium-Earth Orbit (MEO) satellite | 7000-25000 km | | 100-1000 km |
| Geostationary Earth Orbit (GEO) satellite | 35 786 km | | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

GEO satellite and Unmanned Aircraft System (UAS) are used to provide continental, regional or local service. A constellation of LEO and MEO is used to provide services in both Northern and Southern hemispheres. In some case, the constellation can even provide global coverage including polar regions. For the later, this requires appropriate orbit inclination, sufficient beams generated and inter-satellite links.

HEO satellite systems are not considered in this document.

Non-Terrestrial Networks reference scenarios are described.

Non-terrestrial networks may provide access to user equipment in six reference scenarios including
  Circular orbiting and notional station keeping platforms.
  Highest RTD constraint
  Highest Doppler constraint
  A transparent and a regenerative payload
  One ISL case and one without ISL. Regenerative payload is mandatory in the case of inter-satellite links.
  Fixed or steerable beams resulting respectively in moving or fixed beam foot print on the ground Table 6 shows some example of reference scenarios for NTN.

TABLE 6

| | Transparent satellite | Regenerative satellite |
|---|---|---|
| GEO based non-terrestrial access network | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

Table 7 shows some example of reference scenario parameters for NTN.

TABLE 7

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km / 1,200 km |
| Spectrum (service link) | <6 GHz (e.g. 2 GHz) / >6 GHz (e.g. DL 20 GHz, UL 30 GHz) | |
| Max channel bandwidth capability (service link) | 30 MHz for band <6 GHz / 1 GHz for band >6 GHz | |
| Payload | Scenario A: Transparent (including radio frequency function only) Scenario B: regenerative (including all or part of RAN functions) | Scenario C: Transparent (including radio frequency function only) Scenario D: Regenerative (including all or part of RAN functions) |
| Inter-Satellite link | No | Scenario C: No Scenario D: Yes/No (Both cases are possible.) |
| Earth-fixed beams | Yes | Scenario C1: Yes (steerable beams), see note 1 Scenario C2: No (the beams move with the satellite) Scenario D 1: Yes (steerable beams), see note 1 Scenario D 2: No (the beams move with the satellite) |

TABLE 7-continued

| Scenarios | GEO based non-terrestrial access network (Scenario A and B) | LEO based non-terrestrial access network (Scenario C & D) |
|---|---|---|
| Max beam foot print size (edge to edge) regardless of the elevation angle | 3500 km (Note 5) | 1000 km |
| Min Elevation angle for both sat-gateway and user equipment | 10° for service link and 10° for feeder link | 10° for service link and 10° for feeder link |
| Max distance between satellite and user equipment at min elevation angle | 40,581 km | 1,932 km (600 km altitude) 3,131 km (1,200 km altitude) |
| Max Round Trip Delay (propagation delay only) | Scenario A: 541.46 ms (service and feeder links) Scenario B: 270.73 ms (service link only) | Scenario C: (transparent payload: service and feeder links) 25.77 ms (600 km) 41.77 ms (1200 km) Scenario D: (regenerative payload: service link only) 12.89 ms (600 km) 20.89 ms (1200 km) |
| Max differential delay within a cell (Note 6) | 10.3 ms | 3.12 ms and 3.18 ms for respectively 600 km and 1200 km |
| Max Doppler shift (earth fixed user equipment) | 0.93 ppm | 24 ppm (600 km) 21 ppm(1200 km) |
| Max Doppler shift variation (earth fixed user equipment) | 0.000 045 ppm/s | 0.27 ppm/s (600 km) 0.13 ppm/s(1200 km) |
| User equipment motion on the earth | 1200 km/h (e.g. aircraft) | 500 km/h (e.g. high speed train) Possibly 1200 km/h (e.g. aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 20 W | |
| User equipment Noise figure | Omnidirectional antenna: 7 dB Directive antenna: 1.2 dB | |
| Service link | 3GPP defined New Radio | |
| Feeder link | 3GPP or non-3GPP defined Radio interface | 3GPP or non-3GPP defined Radio interface |

Each satellite has the capability to steer beams towards fixed points on earth using beamforming techniques. This is applicable for a period of time corresponding to the visibility time of the satellite Max delay variation within a beam (earth fixed user equipment) is calculated based on Min Elevation angle for both gateway and user equipment Max differential delay within a beam is calculated based on Max beam foot print diameter at nadir Speed of light used for delay calculation is 299792458 m/s.

The Maximum beam foot print size for GEO is based on current state of the art GEO High Throughput systems, assuming either spot beams at the edge of coverage (low elevation).

The maximum differential delay at cell level has been computed considering the one at beam level for largest beam size. It does not preclude that cell may include more than one beam when beam size are small or medium size. However the cumulated differential delay of all beams within a cell will not exceed the maximum differential delay at cell level in the table above.

The NTN study results apply to GEO scenarios as well as all NGSO scenarios with circular orbit at altitude greater than or equal to 600 km. Meanwhile, in NTN, low Earth orbit (LEO) satellites may revolve around the earth and each LEO satellite may have different orbit and cycle of revolution. Therefore, from view of UE on the ground, a list of LEO satellites may change dynamically.

Regarding that maximum beam foot print size of Geostationary Earth Orbiting (GEO) satellite is 3500 km and maximum beam foot print size of LEO satellite is 1000 km, it is expected that much more UEs would camp on NTN cell compared with terrestrial NR cells. Therefore, it would increase much signalling load to provide dedicated signalling or broadcast signalling to the UEs by NTN cell.

For example, a list of neighbour LEO satellite cells may change as time goes because of revolutions of satellites. Each UE camping on an NTN cell may have different neighbour cell list based on its geographical area. Therefore, it may need very big signalling load to provide different neighbour cell list to each UE.

As LEO satellites revolves around the earth periodically and the trace is almost fixed, it can be assumed that change of the neighbour NTN cell list is predictable. Therefore, if the network provides list of sets of neighbour NTN cell list to each UE with one-shot signalling and each UE applies the list of sets sequentially as time goes, the network may not need to provide the neighbour cell list to each UE every time it changes.

Therefore, studies for utilizing a dynamic configuration in a wireless communication system are required.

Hereinafter, a method for utilizing a dynamic configuration in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 12:
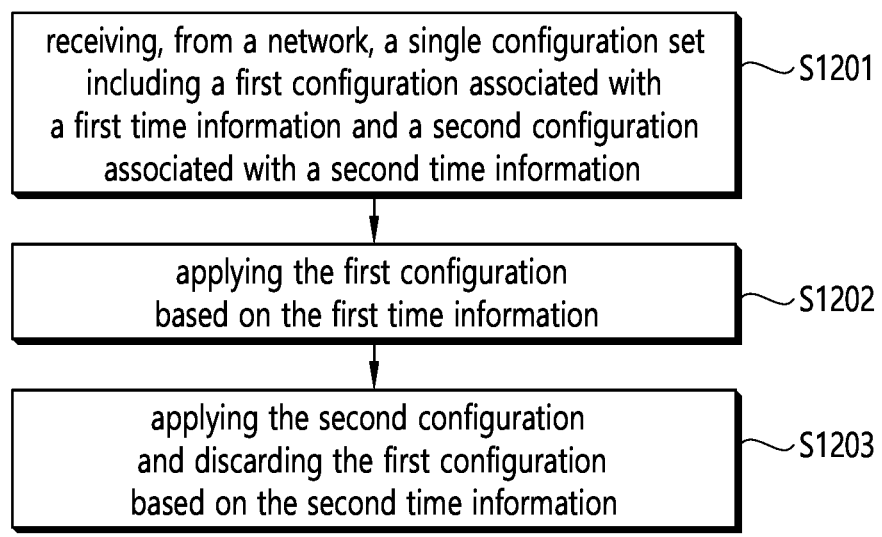
FIG. 12 shows an example of a method for utilizing a dynamic configuration in a wireless communication system, according to some embodiments of the present disclosure.

FIG. 12 shows an example of a method for utilizing a dynamic configuration in a wireless communication system, according to some embodiments of the present disclosure.

In particular, FIG. 12 shows an example of a method performed by a wireless device.

In step S1201, a wireless device may receive, from a network, a single configuration set including a first configuration associated with a first time information and a second configuration associated with a second time information.

For example, the single configuration set may be different from another single configuration set provided for another wireless device in the cell. For example, the single configuration set may be based on a location of the wireless device (for example, a geographical area of the wireless device). For example, the network may generate the single configuration set for the wireless device based on the location or the geographical area of the wireless device.

For example, the single configuration set may be transmitted from a Non-terrestrial network (NTN) cell. For example, the single configuration set may be different from another single configuration set for another wireless device in the NTN cell.

In other words, for example, a first wireless device camped on the NTN cell may receive a first single configuration set. A second wireless device camped on the NTN cell may receive a second single configuration set. In this case, the first single configuration set may be different from the second single configuration set.

For example, the first single configuration set may be generated based on a location of the first wireless device. The second single configuration set may be generated based on a location of the second wireless device. The first single configuration set and the second single configuration set may be different from each other, since the location of the first wireless device and the location of the second wireless device are different each other.

For example, the first single configuration set may be generated based on a movement of the first wireless device. The second single configuration set may be generated based on a movement of the second wireless device. The first single configuration set and the second single configuration set may be different from each other, since the movement of the first wireless device and the movement of the second wireless device are different each other.

For example, the first configuration may include a first frequency list and a first cell list for a measurement procedure, a cell selection procedure, and/or a cell reselection procedure. The second configuration may include a second frequency list and a second cell list for a measurement procedure, a cell selection procedure, and/or a cell reselection procedure.

For example, the single configuration set may include configuration for a conditional handover procedure. For example, the first configuration may include an information on a list of candidate cells for a conditional handover procedure. The first time information includes information on a validity time information for the list of candidate cells. For example, the validity time information may inform a time duration when the wireless device is able to access a cell in the list of candidate cells. For example, the validity time information may inform a time duration when the wireless device is allowed to execute conditional handover to a cell in the list of candidate cells. For example, the validity time information may include a start time point and an end time point for accessing each cell in the list of candidate cells. In other words, the single configuration set may include timing information in conditional handover (CHO) execution triggering for a network (for example, an NTN) describing the time after which the wireless device is allowed to execute CHO to the candidate target cell. For example, the time information for CHO execution triggering in NTN may be defined in a form of a timer or timers.

For example, the single configuration set may include configuration for location-based CHO execution (or configuration for triggering location-based CHO execution) for a network (for example, a NTN). For example, a location for the location-based CHO execution triggering may include the distance between the UE and the reference location of the cell (serving cell or the target cell). For example, the reference location of the cell may be a cell center or other point of cell. For example, the network may provide the reference location to a wireless device.

For example, the single configuration set may be transmitted via a dedicated signal. For example, the single configuration set may be included in a Radio Resource Control (RRC) release message and/or an RRC reconfiguration message from the network.

For example, the single configuration set may be provided via broadcast system information. For example, the network may broadcast different single configuration to wireless devices in a single NTN cell based on the location of wireless devices.

For example, the single configuration set may be provided only once.

In step S1202, a wireless device may apply the first configuration based on the first time information.

In step S1203, a wireless device may apply the second configuration and may discard the first configuration based on the second time information.

For example, a wireless device may perform a measurement procedure based on the first configuration, while the first configuration is applied.

For example, a wireless device may trigger the measurement procedure based on the first time information. In other words, a wireless device may initiate the measurement procedure based on the first configuration, upon the first configuration is applied.

For example, a wireless device may perform a cell selection procedure, a cell reselection procedure, a handover procedure, and/or a conditional handover procedure based on results of the measurement procedure.

According to some embodiments of the present disclosure, a wireless device may check whether a condition for a conditional handover procedure is satisfied. For example, a condition for a conditional handover procedure may be included in the first configuration and the second configuration. For example, a wireless device may use the results of the measurement procedure to determine whether a condition is satisfied or not.

For example, a wireless device may perform a conditional handover procedure, while the first configuration is applied. A wireless device may use the first configuration for the conditional handover procedure. For example, a wireless device may check whether candidate cells included in the first configuration satisfy a condition for the conditional handover procedure during a validity time included in the first time information.

In other words, for example, a wireless device may perform a measurement procedure, a cell selection procedure, a cell reselection procedure, a handover procedure, and/or a conditional handover procedure based on the first configuration, while the first configuration is applied. A wireless device may perform a measurement procedure, a cell selection procedure, a cell reselection procedure, a handover procedure, and/or a conditional handover procedure based on the second configuration, while the second configuration is applied.

For example, in steps S1202 and S1203, a wireless device may change from the first configuration to the second configuration without receiving a signal from the network. In other words, a wireless device may automatically discard the first configuration and apply the second configuration based on the first time information and the second time information.

According to some embodiments of the present disclosure, the first time information and the second time information may be configured as absolute time point.

For example, the first time information may inform a first time point to apply the first configuration. The second time information may inform a second time point to apply the second configuration.

For other example, the first time information may inform a first time point to discard the first configuration. The second time information may inform a second time point to discard the second configuration.

According to some embodiments of the present disclosure, the first time information and the second time information may be configured as relative time period.

For example, the first time information may inform a first time period to apply the first configuration. The second time information may inform a second time period to apply the second configuration.

According to some embodiments of the present disclosure, the single configuration set may further include a third configuration associated with a third time information.

For example, a wireless device may apply the third configuration subsequently after applying the first configuration and the second configuration.

According to some embodiments of the present disclosure, each configuration included in the single configuration set may include one or more parameter(s).

For example, a first value of the parameter may be included in the first configuration. In step S1202, a wireless device may set a value of a parameter with the first value of the parameter for a measurement procedure, a cell selection procedure, and/or a cell reselection procedure.

For example, a second value of the parameter may be included in the second configuration. In step S1203, a wireless device may change a value of the parameter from the first value to the second value for a measurement procedure, a cell selection procedure, and/or a cell reselection procedure.

According to some embodiments of the present disclosure, the wireless device may be in communication with at least one of a user equipment, a network, or an autonomous vehicle other than the wireless device.

Figure 13:
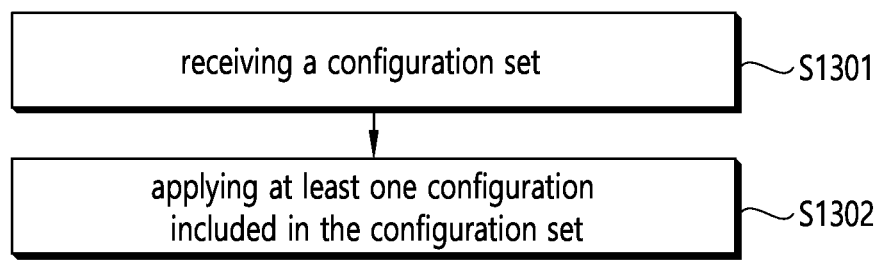
FIG. 13 shows an example of a method for utilizing a dynamic configuration in a wireless communication system, according to some embodiments of the present disclosure.

FIG. 13 shows an example of a method for utilizing a dynamic configuration in a wireless communication system, according to some embodiments of the present disclosure.

According to some embodiments of the present disclosure, a configuration set including configurations with validity timer of each configuration may be provided to UE at one-shot signalling.

For example, the validity timer of each configuration may indicate validity time during which the corresponding configuration is valid. The configurations included in the configuration set may be configured in sequence.

For example, UE may apply the first configuration included in the configuration set and start the first timer corresponding to the first configuration upon applying the first configuration. When the first timer expires, the UE may apply the second configuration included in the configuration set and start the second timer corresponding to the second configuration upon applying the second configuration. When the second timer expires, the UE may apply the third configuration included in the configuration set, and so on.

In step S1301, a UE may receive a configuration set.

For example, the configuration set may be provided via dedicated signalling (for example, RRCRelease message, RRCReconfiguration message).

For example, the configuration set may be provided via broadcast system information.

For example, the configuration set may be provided only once.

For example, the configuration set may include one or more configuration(s).

For example, the one or more configuration(s) in the configuration set may be in order (for example, in sequence). For example, if the configuration set includes n number of configurations, the configuration set may include the first configuration, second configuration, third configuration, . . . (m)-th configuration, (m+1)-th configuration, . . . and n-th configuration.

For example, the n number of configurations in the configuration set may be applied in sequence according to the order in the configuration set. For example, when the UE receives the configuration set, the UE may firstly apply the first configuration, and then the second configuration, and so on.

For example, when (m)-th configuration is discarded and/or not valid, the UE may apply the next configuration, for example, the (m+1)-th configuration.

According to some embodiments of the present disclosure, each configuration in the configuration set may include one or more parameter(s).

For example, the parameter may be configured as absolute value. In this case, UE may change value of the parameter to configured absolute value, when the UE applies configuration including the parameters.

For example, the configuration set may include:
a first configuration including parameter A with absolute value 5
a second configuration including parameter A with absolute value 7.

When the UE applies the first configuration, the UE may set value of the parameter A to 5. After that, when the UE applies the second configuration, the UE may change value of the parameter A from 5 to 7.

For example, the parameter may be configured as relative value. The relative value may include and/or may be associated with mathematical symbols (for example, addition (+), subtraction (−), multiplication (*), division (/)). In this case, UE may change value of the parameter to the calculated value by applying the relative value to the previous value of the parameter, when the UE applies configuration including the parameters.

For example, the configuration set may include:
a first configuration including parameter B with relative value +9 a second configuration including parameter B with relative value −3.

When the UE applies the first configuration, the UE may set value of the parameter B to 9. After that, when the UE applies the second configuration, the UE may change value of the parameter B from 9 to 6 (6=9-3).

For example, the configuration set may include:
a first configuration including parameter B with relative value +7
a second configuration including parameter B with relative value *2.

When the UE applies the first configuration, the UE may set value of the parameter B to 7. After that, when the UE applies the second configuration, the UE may change value of the parameter B from 7 to 14 (14=7*2).

According to some embodiments of the present disclosure, each configuration in the configuration set may include validity time. Or, each configuration in the configuration set may be associated with validity time.

For example, the validity time may be configured as absolute time point (for example, Coordinated Universal Time (UTC)).

For example, the absolute time point may indicate when the UE applies the configuration corresponding to the absolute time point. Then, at configured absolute time point corresponding to the configuration, the UE may discard the existing configuration (for example, previous configuration) and apply the configuration.

For example, the configuration set may include:
a first configuration including validity time as 9:00 UTC
a second configuration including validity time as 10:30 UTC.

Then, UE may apply the first configuration at 9:00 UTC. After that, at 10:30 UTC, the UE may discard the first configuration and apply the second configuration.

For example, the absolute time point may indicate when the UE discards the configuration corresponding to the absolute time point. Then, at configured absolute time point corresponding to the configuration, the UE may discard the configuration and apply the next configuration in the configuration set.

For example, the configuration set may include:
a first configuration including validity time as 9:00 UTC
a second configuration including validity time as 10:30 UTC.

Then UE may apply the first configuration when UE receives the configuration set. At 9:00 UTC, the UE may discard the first configuration and apply the second configuration. After that, at 10:30 UTC, the UE may discard the second configuration.

For example, the validity time may be configured as relative time period. (for example, seconds, minutes, hours, days) Then, the UE may apply the configuration for the relative time period. For example, upon applying the configuration, the UE may apply the relative time period corresponding to the configuration (for example, starting a timer based on the relative time period upon applying the configuration). When the relative time period expires, the UE may discard the configuration and apply the next configuration.

For example, the configuration set may include:
a first configuration including validity time as 5 minutes
a second configuration including validity time as 30 seconds
a third configuration including validity time as 2 minutes.

Then the UE may firstly apply the first configuration. When 5 minutes elapses, the UE may discard the first configuration and apply the second configuration. When 30 seconds elapses, the UE may discard the second configuration and apply the third configuration. When 2 minutes elapses, the UE may discard the third configuration.

In step S1302, the UE may apply at least one configuration included in the configuration set.

For example, the UE may apply the absolute value and/or the relative value included in each configuration.

For example, the UE may apply each configuration at the absolute time point and/or at the relative time point associated with each configuration.

For example, the UE may apply each configuration autonomously. In other words, the UE may apply each configuration without receiving from the network whenever the configuration changes.

Figure 14:
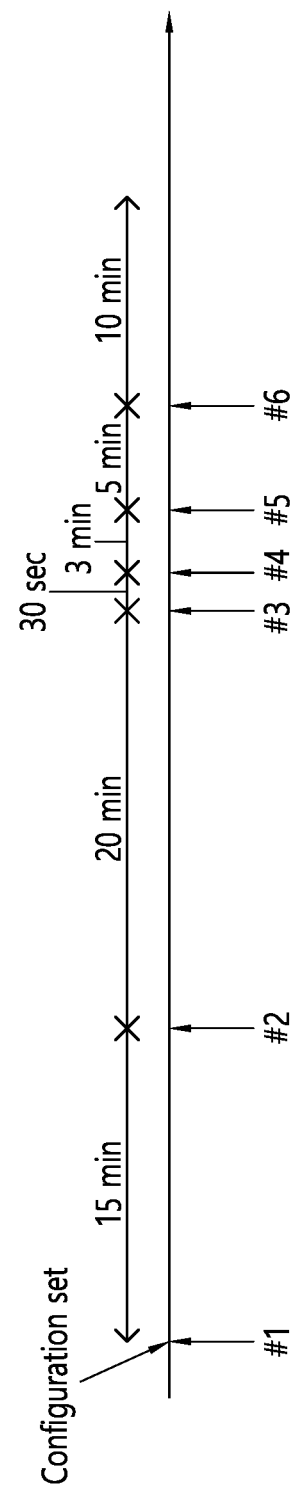
FIG. 14 shows an example of a method for applying each configuration in the configuration set based on validity time of each configuration, according to some embodiments of the present disclosure.

FIG. 14 shows an example of a method for applying each configuration in the configuration set based on validity time of each configuration, according to some embodiments of the present disclosure.

For example, table 8 shows an example of the configuration set including frequency list. In the table 8, each configuration in the configuration set may include frequency list on which UE perform measurements and validity time. Each frequency in the frequency list may include cell list of the frequency.

TABLE 8

| Configuration number | Frequency list | Cell list | Validity time |
|---|---|---|---|
| #1 | Frequency A, B, C | A: a1, a2, B: b1, C: c1, c2 | 15 minutes |
| #2 | Frequency B | B: b2 | 20 minutes |
| #3 | Frequency A, C, D | A: a2, C: c1, c2, c3, D: d1 | 30 seconds |
| #4 | Frequency B, C, D | B: b1, b2, b3, C: c3, D: d1, d2 | 3 minutes |
| #5 | Frequency A, B | A: a1, B: b1 | 5 minutes |
| #6 | Frequency A | A: a2, a3, a4 | 10 minutes |

For example, the UE may receive, from a network, a configuration set including six configurations, for example, a first configuration, a second configuration, a third configuration, a fourth configuration, a fifth configuration, and a sixth configuration.

First configuration may include a first frequency list, a first cell list, and a first validity time. The first frequency list may include frequency A, frequency B, and frequency C. The first cell list may include (1) cell a1 and a2 for frequency A, (2) cell b1 for frequency B, and (3) cell c1 and c2 for frequency C. The first validity time may be 15 minutes. For example, the first validity time may be a relative time value for applying the first configuration.

Second configuration may include a second frequency list, a second cell list, and a second validity time. The second frequency list may include frequency B. The second cell list may include cell b2 for frequency B. The second validity time may be 20 minutes. For example, the second validity time may be a relative time value for applying the second configuration.

Third configuration may include a third frequency list, a third cell list, and a third validity time. The third frequency list may include frequency A, frequency C, and frequency D. The third cell list may include (1) cell a2 for frequency A, (2) cell c1, c2, and c3 for frequency C, and (3) cell d1 for frequency D. The third validity time may be 30 minutes. For example, the third validity time may be a relative time value for applying the third configuration.

Fourth configuration may include a fourth frequency list, a fourth cell list, and a fourth validity time. The fourth frequency list may include frequency B, frequency C, and frequency D. The fourth cell list may include (1) cell b1, b2, and b3 for frequency B, (2) cell c3 for frequency C, and (3) cell d1 and d2 for frequency D. The fourth validity time may be 3 minutes. For example, the fourth validity time may be a relative time value for applying the fourth configuration.

Fifth configuration may include a fifth frequency list, a fifth cell list, and a fifth validity time. The fifth frequency list may include frequency A and frequency B. The fifth cell list may include (1) cell a1 for frequency A and (2) cell b1 for frequency B. The fifth validity time may be 5 minutes. For example, the fifth validity time may be a relative time value for applying the fifth configuration.

Sixth configuration may include a sixth frequency list, a sixth cell list, and a sixth validity time. The sixth frequency list may include frequency A. The sixth cell list may include cell a2, a2, and a4 for frequency A. The sixth validity time may be 10 minutes. For example, the sixth validity time may be a relative time value for applying the sixth configuration.

Referring to FIG. 14, in step S1401, a UE may receive a configuration set. As soon as receiving the configuration set, the UE may apply the first configuration (configuration #1). Then, the UE may perform measurements on frequency A, B, and C.

In step S1402, 15 minutes passes after step S1201, the UE may discard the configuration #1 and apply the second configuration (configuration #2). The UE may perform measurements on frequency B.

In step S1403, 20 minutes passes after step S1202, the UE may discard the configuration #2 and apply the third configuration (configuration #3). The UE may perform measurements on frequency A, C, and D.

In step S1404, 30 seconds passes after step S1203, the UE may discard the configuration #3 and apply the fourth configuration (configuration #4). The UE may perform measurements on frequency B, C and D.

In step S1405. 3 minutes passes after step S1204, the UE may discard the configuration #4 and apply the fifth configuration (configuration #5). The UE may perform measurements on frequency A and B.

In step S1406. 5 minutes passes after step S1205, the UE may discard the configuration #5 and apply the sixth configuration (configuration #6). The UE may perform measurements on frequency A.

In step S1407, 10 minutes passes after step S1206, the UE may discard the configuration #6.

In this example, UE may apply the first configuration, the second configuration, the third configuration, the fourth configuration, the fifth configuration, and the sixth configuration, subsequently based on the validity time. In other words, the UE may apply each configuration subsequently without receiving from the network whenever the configuration changes.

Hereinafter, an apparatus for utilizing a dynamic configuration in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, a single configuration set including a first configuration associated with a first time information and a second configuration associated with a second time information. The processor 102 may be configured to apply the first configuration based on the first time information. The processor 102 may be configured to apply the second configuration and to discard the first configuration based on the second time information.

For example, the single configuration set may be different from another single configuration set provided for another wireless device in the cell. For example, the single configuration set may be based on a location of the wireless device.

For example, the first configuration may include an information on a list of candidate cells for a conditional handover procedure. The first time information may include information on a validity time information for the list of candidate cells.

For example, the validity time information informs a time duration when the wireless device is able to access a cell in the list of candidate cells. For example, a wireless device may be provided a timely-dynamic conditional handover configuration.

For example, the single configuration set may be transmitted from a Non-terrestrial network (NTN) cell.

For example, the single configuration set may be different from another single configuration set for another wireless device in the NTN cell.

For example the first configuration may include a first frequency list and a first cell list and the second configuration includes a second frequency list and a second cell list for a measurement procedure, a cell selection procedure, and/or a cell reselection procedure.

For example, the processor 102 may be configured to perform a measurement procedure, a cell selection procedure, and/or a cell reselection procedure based on the first configuration, while the first configuration is applied. The processor 102 may be configured to perform a measurement procedure, a cell selection procedure, and a cell reselection procedure based on the second configuration, while the second configuration is applied.

For example, the processor 102 may be configured to trigger the measurement procedure based on the first time information.

For example, the processor 102 may be configured to perform a cell selection procedure, a cell reselection procedure, a handover procedure, and/or a conditional handover procedure based on results of the measurement procedure.

According to some embodiments of the present disclosure, the first time information may inform a first time point to apply the first configuration. The second time information may inform a second time point to apply the second configuration.

According to some embodiments of the present disclosure, the first time information may inform a first time point to discard the first configuration. The second time information may inform a second time point to discard the second configuration.

According to some embodiments of the present disclosure, the first time information may inform a first time period to apply the first configuration. The second time information may inform a second time period to apply the second configuration.

For example, the processor 102 may be configured to change from the first configuration to the second configuration without receiving a signal from the network.

For example, the single configuration set further may include a third configuration associated with a third time information. In this case, the processor 102 may be configured to apply the third configuration subsequently after applying the first configuration and the second configuration.

For example, a first value may be included in the first configuration. In this case, the applying the first configuration may include setting a value of a parameter with a first value for a measurement procedure, a cell selection procedure, and/or a cell reselection procedure.

For example, a second value may be included in the second configuration. In this case, the applying the second configuration may include changing the value of the parameter from the first value to the second value for a cell selection procedure, and/or a cell reselection procedure.

According to some embodiments of the present disclosure, the single configuration set may be transmitted via a dedicated signal.

For example, the single configuration set may be included in a Radio Resource Control (RRC) release message and/or an RRC reconfiguration message from the network.

According to some embodiments of the present disclosure, the processor 102 may be configured to be in communication with at least one of a user equipment, a network, or an autonomous vehicle other than the wireless device.

Hereinafter, a processor for a wireless device for utilizing a dynamic configuration in a wireless communication system, according to some embodiments of the present disclosure, will be described.

The processor may be configured to control the wireless device to receive, from a network, a single configuration set including a first configuration associated with a first time information and a second configuration associated with a second time information. The processor may be configured to control the wireless device to apply the first configuration based on the first time information. The processor may be configured to control the wireless device to apply the second configuration and to discard the first configuration based on the second time information.

For example, the single configuration set may be different from another single configuration set provided for another wireless device in the cell. For example, the single configuration set may be based on a location of the wireless device.

For example, the first configuration may include an information on a list of candidate cells for a conditional handover procedure. The first time information may include information on a validity time information for the list of candidate cells.

For example, the validity time information informs a time duration when the wireless device is able to access a cell in the list of candidate cells. For example, a wireless device may be provided a timely-dynamic conditional handover configuration.

For example, the single configuration set may be transmitted from a Non-terrestrial network (NTN) cell.

For example, the single configuration set may be different from another single configuration set for another wireless device in the NTN cell.

For example the first configuration may include a first frequency list and a first cell list and the second configuration includes a second frequency list and a second cell list for a measurement procedure, a cell selection procedure, and/or a cell reselection procedure.

For example, the processor may be configured to control the wireless device to perform a measurement procedure, a cell selection procedure, and/or a cell reselection procedure based on the first configuration, while the first configuration is applied. The processor may be configured to control the wireless device to perform a measurement procedure, a cell selection procedure, and a cell reselection procedure based on the second configuration, while the second configuration is applied.

For example, the processor may be configured to control the wireless device to trigger the measurement procedure based on the first time information.

For example, the processor may be configured to control the wireless device to perform a cell selection procedure, a cell reselection procedure, a handover procedure, and/or a conditional handover procedure based on results of the measurement procedure.

According to some embodiments of the present disclosure, the first time information may inform a first time point to apply the first configuration. The second time information may inform a second time point to apply the second configuration.

According to some embodiments of the present disclosure, the first time information may inform a first time point to discard the first configuration. The second time information may inform a second time point to discard the second configuration.

According to some embodiments of the present disclosure, the first time information may inform a first time period to apply the first configuration. The second time information may inform a second time period to apply the second configuration.

For example, the processor may be configured to control the wireless device to change from the first configuration to the second configuration without receiving a signal from the network.

For example, the single configuration set further may include a third configuration associated with a third time information. In this case, the processor may be configured to control the wireless device to apply the third configuration subsequently after applying the first configuration and the second configuration.

For example, a first value may be included in the first configuration. In this case, the applying the first configuration may include setting a value of a parameter with a first value for a measurement procedure, a cell selection procedure, and/or a cell reselection procedure.

For example, a second value may be included in the second configuration. In this case, the applying the second configuration may include changing the value of the parameter from the first value to the second value for a cell selection procedure, and/or a cell reselection procedure.

According to some embodiments of the present disclosure, the single configuration set may be transmitted via a dedicated signal.

For example, the single configuration set may be included in a Radio Resource Control (RRC) release message and/or an RRC reconfiguration message from the network.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for utilizing a dynamic configuration in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, a single configuration set including a first configuration associated with a first time information and a second configuration associated with a second time information. The stored a plurality of instructions may cause the wireless device to apply the first configuration based on the first time information. The stored a plurality of instructions may cause the wireless device to apply the second configuration and to discard the first configuration based on the second time information.

For example, the single configuration set may be different from another single configuration set provided for another wireless device in the cell. For example, the single configuration set may be based on a location of the wireless device.

For example, the first configuration may include an information on a list of candidate cells for a conditional handover procedure. The first time information may include information on a validity time information for the list of candidate cells.

For example, the validity time information informs a time duration when the wireless device is able to access a cell in the list of candidate cells. For example, a wireless device may be provided a timely-dynamic conditional handover configuration.

For example, the single configuration set may be transmitted from a Non-terrestrial network (NTN) cell.

For example, the single configuration set may be different from another single configuration set for another wireless device in the NTN cell.

For example the first configuration may include a first frequency list and a first cell list and the second configuration includes a second frequency list and a second cell list for a measurement procedure, a cell selection procedure, and/or a cell reselection procedure.

For example, the stored a plurality of instructions may cause the wireless device to perform a measurement procedure, a cell selection procedure, and/or a cell reselection procedure based on the first configuration, while the first configuration is applied. The stored a plurality of instructions may cause the wireless device to perform a measurement procedure, a cell selection procedure, and a cell reselection procedure based on the second configuration, while the second configuration is applied.

For example, the stored a plurality of instructions may cause the wireless device to trigger the measurement procedure based on the first time information.

For example, the stored a plurality of instructions may cause the wireless device to perform a cell selection procedure, a cell reselection procedure, a handover procedure, and/or a conditional handover procedure based on results of the measurement procedure.

According to some embodiments of the present disclosure, the first time information may inform a first time point to apply the first configuration. The second time information may inform a second time point to apply the second configuration.

According to some embodiments of the present disclosure, the first time information may inform a first time point to discard the first configuration. The second time information may inform a second time point to discard the second configuration.

According to some embodiments of the present disclosure, the first time information may inform a first time period to apply the first configuration. The second time information may inform a second time period to apply the second configuration.

For example, the stored a plurality of instructions may cause the wireless device to change from the first configuration to the second configuration without receiving a signal from the network.

For example, the single configuration set further may include a third configuration associated with a third time information. In this case, the stored a plurality of instructions may cause the wireless device to apply the third configuration subsequently after applying the first configuration and the second configuration.

For example, a first value may be included in the first configuration. In this case, the applying the first configuration may include setting a value of a parameter with a first value for a measurement procedure, a cell selection procedure, and/or a cell reselection procedure.

For example, a second value may be included in the second configuration. In this case, the applying the second configuration may include changing the value of the parameter from the first value to the second value for a cell selection procedure, and/or a cell reselection procedure.

According to some embodiments of the present disclosure, the single configuration set may be transmitted via a dedicated signal.

For example, the single configuration set may be included in a Radio Resource Control (RRC) release message and/or an RRC reconfiguration message from the network.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for utilizing a dynamic configuration in a wireless communication system, according to some embodiments of the present disclosure, will be described.

The BS may transmit, to a first wireless device, a first single configuration set including first multiple configurations associated with a first time information. The BS may transmit, to a second wireless device, a second single configuration set including second multiple configurations associated with a second time information. The first single configuration set is different from the second single configuration set.

For example, the first multiple configurations may be applied to the first wireless device, subsequently, based on the first time information. The second multiple configurations may be applied to the second wireless device, subsequently, based on the second time information.

Hereinafter, a base station (BS) for utilizing a dynamic configuration in a wireless communication system, according to some embodiments of the present disclosure, will be described.

The BS may include a transceiver, a memory, and a processor operatively coupled to the transceiver and the memory.

The processor may be configured to control the transceiver to transmit, to a first wireless device, a first single configuration set including first multiple configurations associated with a first time information. The processor may be configured to control the transceiver to transmit, to a second wireless device, a second single configuration set including second multiple configurations associated with a second time information. The first single configuration set is different from the second single configuration set.

For example, the first multiple configurations may be applied to the first wireless device, subsequently, based on the first time information. The second multiple configurations may be applied to the second wireless device, subsequently, based on the second time information.

The present disclosure can have various advantageous effects.

According to some embodiments of the present disclosure, a wireless device could apply dynamic configuration efficiently.

For example, a wireless device could receive a set of configuration through a single message.

For example, a wireless device could change configuration by itself for a measurement procedure, a cell selection procedure, and/or a cell reselection procedure based on the set of configuration and a time information.

According to some embodiments of the present disclosure, a wireless communication system could efficiently provide a solution for utilizing a dynamic configuration.

For example, a network may not need to provide configuration every time the configuration changes. Based on the parameters and validity timer in each configuration included in a set of configuration, the UE could apply the configurations in sequence based on the validity timer by itself.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising,
    receiving, by a wireless device from a network, a single configuration set including a first configuration and a second configuration,
    wherein the first configuration includes (i) information related to a first frequency list and a first cell list and (ii) first time information for applying the first configuration, and
    wherein the second configuration includes (i) information related to a second frequency list and a second cell list and (ii) second time information for applying the second configuration;
    applying, by the wireless device, the first configuration based on the first time information;
    performing, by the wireless device, a first measurement procedure for the first frequency list and the first cell list while applying the first configuration;
    performing, by the wireless device, a cell selection procedure, a cell reselection procedure, a handover procedure, or a conditional handover procedure based on results of the first measurement procedure;
    applying, by the wireless device, the second configuration based on the second time information;
    performing, by the wireless device, a second measurement procedure for the second frequency list and the second cell list while applying the second configuration; and
    performing, by the wireless device, a cell selection procedure, a cell reselection procedure, a handover procedure, or a conditional handover procedure based on results of the second measurement procedure,
    wherein the single configuration set is different from another single configuration set provided for another wireless device in the cell.

2. The method of claim 1, wherein the single configuration set is transmitted from a Non-terrestrial network (NTN) cell.

3. The method of claim 1, wherein the method further comprises,
    changing, by the wireless device, from the first configuration to the second configuration without receiving a signal from the network.

4. The method of claim 1,
wherein the first configuration includes an information on a first list of candidate cells for a conditional handover procedure, and
wherein the first list of candidate cells for a conditional handover procedure is valid while applying the first configuration.

5. The method of claim 1,
wherein the single configuration set is included in a Radio Resource Control (RRC) release message or an RRC reconfiguration message from the network.

6. The method of claim 1,
wherein the wireless device is in communication with at least one of a user equipment, a network, or an autonomous vehicle other than the wireless device.

7. The method of claim 1, wherein the method further comprising:
triggering, by the wireless device, a first timer upon applying the first configuration, wherein the first timer is configured based on the first time information.

8. The method of claim 7, wherein the method further comprising:
discarding, by the wireless device, the first configuration upon expiry of the first timer.

9. The method of claim 1, wherein the method further comprising:
triggering, by the wireless device, a second timer upon applying the second configuration, wherein the second timer is configured based on the second time information.

10. The method of claim 9, wherein the method further comprising:
discarding, by the wireless device, the second configuration upon expiry of the second timer.

11. The method of claim 1,
wherein the single configuration set is based on a location of the wireless device.

12. A wireless device, comprising:
a transceiver;
a memory; and
at least one processor operatively coupled to the transceiver and the memory, and
configured to perform operations, the operations comprising:
receiving, from a network, a single configuration set including a first configuration and a second configuration,
wherein the first configuration includes (i) information related to a first frequency list and a first cell list and (ii) first time information for applying the first configuration, and
wherein the second configuration includes (i) information related to a second frequency list and a second cell list and (ii) second time information for applying the second configuration;
applying the first configuration baesd on the first time information;
performing a first measurement procedure for the first frequency list and the first cell list while applying the first configuration;
performing a cell selection procedure, a cell reselection procedure, a handover procedure, or a conditional handover procedure based on results of the first measurement procedure;
applying the second configuration based on the second time information;
performing a second measurement procedure for the second frequency list and the second cell list while applying the second configuration; and
performing a cell selection procedure, a cell reselection procedure, a handover procedure, or a conditional handover procedure based on results of the second measurement procedure,
wherein the single configuration set is different from another single configuration set provided for another wireless device in the cell.

13. The wireless device of claim 7, wherein the single configuration set is transmitted from a non-terrestrial network cell.

14. The wireless device of claim 12, wherein the operations further comprising:
changing from the first configuration to the second configuration without receiving a signal from the network.

15. The wireless device of claim 12,
wherein the first configuration includes an information on a first list of candidate cells for a conditional handover procedure, and
wherein the first list of candidate cells for a conditional handover procedure is valid while applying the first configuration.

16. The wireless device of claim 12,
wherein the single configuration set is included in a Radio Resource Control (RRC) release message and/or an RRC reconfiguration message from the network.

17. The wireless device of claim 12,
wherein the wireless device is in communication with at least one of a user equipment, a network, or an autonomous vehicle other than the wireless device.

18. The wireless device of claim 12, wherein the operations further comprising:
triggering a first timer upon applying the first configuration, wherein the first timer is configured based on the first time information.

19. The wireless device of claim 18, wherein the operations further comprising:
discarding the first configuration upon expiry of the first timer.

20. The wireless device of claim 12,
wherein the single configuration set is based on a location of the wireless device.

* * * * *